United States Patent Office 2,810,801
Patented Oct. 22, 1957

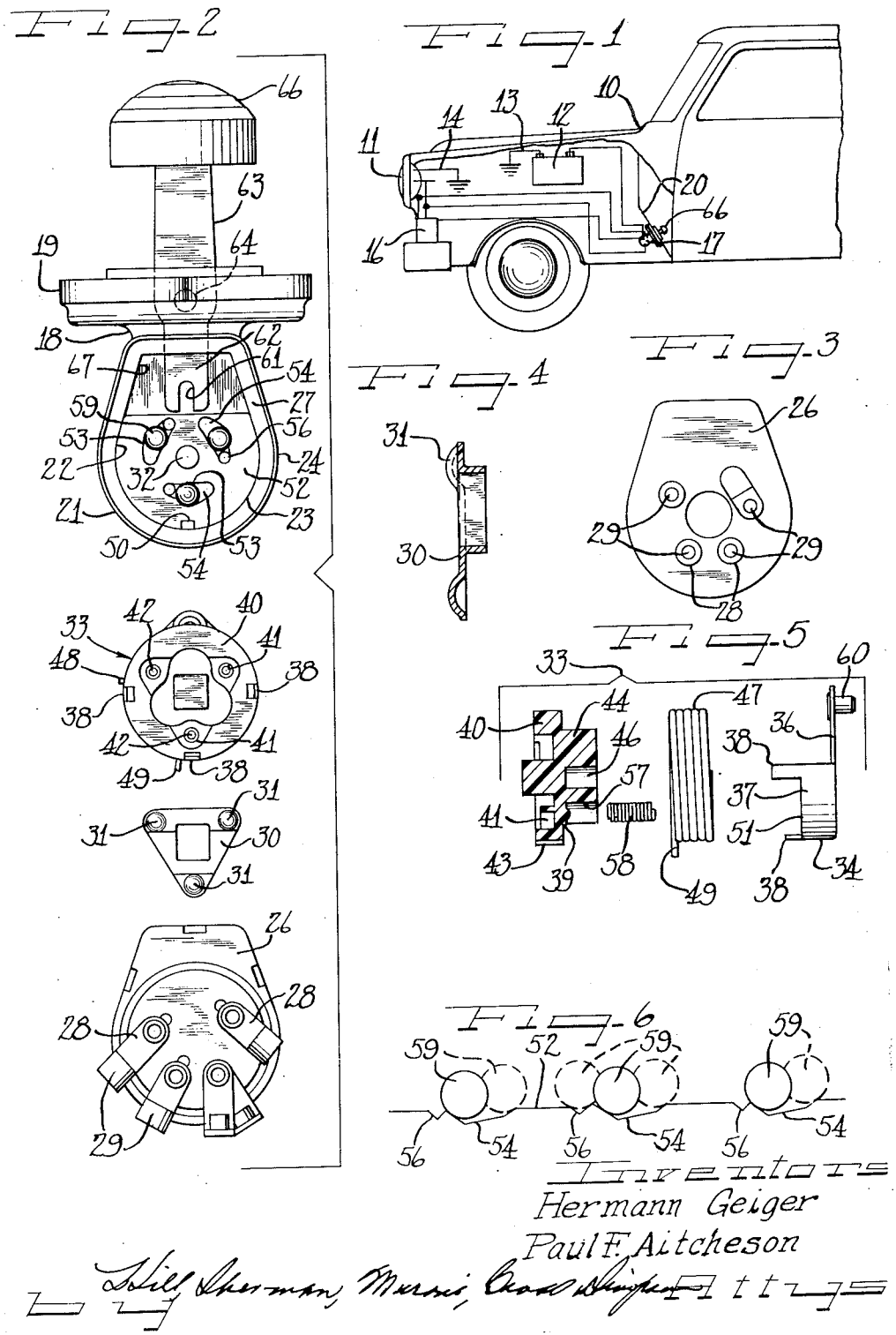

2,810,801

CONTROL SWITCH FOR AUTOMATIC HEADLIGHT CIRCUIT

Hermann Geiger, Bronson, and Paul F. Aitcheson, Coldwater, Mich., assignors to Kingston Products Corporation, Kokomo, Ind., a corporation of Indiana Application October 13, 1954, Serial No. 462,008

4 Claims. (Cl. 200—86.5)

This invention relates generally to control circuit means for an automobile headlight circuit and more particularly relates to an operator controlled switch which is particularly suited to be used in conjunction with a headlight control circuit of the type utilizing light sensitive switching control means, the switch of the present invention being provided for the purpose of selectively temporarily overriding the light sensitive switching means or selectively permanently overriding the light sensitive switching means.

According to the principles of the present invention, a single switch is provided which develops a plurality of control functions. The switch is adapted to be mounted on the floorboard of an automobile and includes an actuator element which may be pedal operated. When used in circuit with a light sensitive switching control means, the pedal actuator may be moved downwardly, thereby completely cutting out the automatic control of the headlight circuit. When the pedal actuator is in the mid position, the automatic feature is cut in.

The pedal actuator may be selectively pushed upwardly to temporarily override the automatic control of the headlight circuit, however, in accordance with the principles of the present invention, a return construction of improved design is provided which restores the switch to full automatic as soon as the pedal actuator is released.

It is an object of the present invention, therefore, to provide an improved control circuit means for an automobile headlight circuit.

Another object of the present invention is to provide an improved form of override switch for an automatic electric circuit.

Yet another object of the present invention is to provide an improved pedal operated multiple position switching device.

A further object of the present invention is to provide a pedal operated switch having improved return means.

Many other features, advantages and additional object of the present invention will become manifest to those versed in the art upon making reference to the detailed description which follows and the accompanying sheets of drawing in which a preferred structural embodiment of a switching device incorporating the principles of the present invention is shown by way of illustrative example.

On the drawings:

Figure 1 is a somewhat diagrammatic view illustrating a control switch in accordance with the principles of the present invention as incorporated in the control circuit of an automobile electric system including headlights of the type projecting both a so-called high beam and a so-called low beam.

Figure 2 is an exploded view illustrating the structural details of the switch provided in accordance with the principles of the present invention.

Figure 3 is an elevational view of the reverse side of the cover shown in Figure 2.

Figure 4 is a cross sectional view somewhat enlarged of the switch contact plate shown in Figure 2.

Figure 5 is an exploded elevational view of the carrier assembly shown in Figure 2; and Figure 6 is a development illustrating additional details of construction of the camming surfaces provided on one wall of the housing shown in Figure 2.

As shown on the drawings:

In Figure 1, there is shown diagrammatically a headlight control circuit for an automotive vehicle. The vehicle is indicated generally at 10, and, in accordance with the usual practice provided with one or more headlights 11. The headlight 11 conveniently comprises a sealed beam lamp of the type consisting of an integral glass envelope having its own reflective surface, filaments and lens and it will be understood that the headlight 11 is of the usual type constructed to project either a so-called high beam or a highway beam and a so-called low beam which is considered more appropriate for driving in congested traffic areas such as in city driving.

The vehicle 10 is provided with a battery 12. One terminal of the battery 12 is grounded as at 13 and an appropriate terminal of the headlight 11 is also grounded as at 14.

To effect automatic regulation of the beam projected by the headlight 11, a light sensitive switching device is provided which is indicated diagrammatically as at 16.

As is well known to those versed in the art, the light sensitive switching means 16 conveniently takes the form of an electric control switch having actuating elements which are responsive to variations in light intensities, and thereby making the switch 16 responsive to the approach of headlights on oncoming cars. By virtue of such provision, the operator of the vehicle is spared the necessity of manually "dimming" or "lowering" the headlight beam as vehicles approach on a roadway from a direction opposite to that being traversed by the vehicle carrying the operator.

Although the automatic regulation of the headlight beam is highly desirable, there are many driving situations which make manual control of the headlight control circuit necessary. For example, in overtaking and passing a vehicle in driving at night, it may be desirable that the headlight beam adjustment be placed in the manual control of the operator. Moreover, the operator may desire to selectively permanently lock out the automatic feature of the headlight control circuit as provided by the light sensitive switching means 16.

Accordingly, in accordance with the principles of the present invention, there is provided a control switch having a pedal operated operating arm which may be moved in one direction to selectively permanently lock out the switch 16. The operating arm may also be selectively actuated in an opposite direction to temporarily override this automatic feature, return means being provided so that the control will be restored to full automatic as soon as the pedal actuator is released.

A switch incorporating the principles of the present invention is indicated generally at 17 and is shown connected in circuit with the battery 12, the headlight 11 and the light sensitive switching means 16.

The switch 17 comprises a housing 18 having an enlarged boss 19 at one end thereof forming a flange which facilitates the convenient assembly of the switch 17 on the floorboard 20 of the vehicle 10.

The housing 18 further includes a hollow casing portion 21 which is concealed below the level of the supporting surface provided by the floorboard 20.

The casing 21 is particularly characterized by a hollow chamber 22 surrounded by upstanding walls 23 terminating in a thin circumferentially extending flange 24.

A base member which also conveniently serves as a cover member 26 is shaped to abut and engage against a shoulder 27 inwardly of the flange 24 whereupon the flange 24 may be staked or peened over to retain the cover member 26 in firm assembly with the casing 21.

As shown in Figure 2, the base or cover member 26 may be made of an electrically non-conductive material and carries a plurality of contact terminals 28 having socket portions 29 to facilitate attachment thereto of appropriate terminals on the ends of the conductor wires illustrated diagrammatically in Figure 1.

The contact terminals 28 extend through the base or cover member 26 as shown in Figure 3 thereby to provide a stationary set of switch contact members given a separate reference numeral for better identification as indicated at 29.

A generally triangularly shaped movable switch contact member is indicated at 30. Switch contact member 30 is made of electrically conductive material and is preferably a stamping having embossments indicated at 31 on Figure 4, to facilitate good electrical contact with stationary switch contact members 29.

As is clearly shown in Figure 2, a hub 32 is formed in the casing 21 and projects inwardly of the chamber 22, thereby establishing a rotational axis for a carrier assembly indicated generally at 33 and illustrated in detail in the exploded view of Figure 5. The carrier assembly 33 includes a frame member 34 which conveniently takes the form of a sheet metal stamping having a body portion 36 and offset side walls 37 terminating in lugs indicated at 38.

A carrier body 39 preferably made of an electrically non-conductive material is of generally annular configuration. The carrier body 39 has a disk-shaped enlarged portion 40 and, as shown in Figure 2, the disk-shaped portion 40 is particularly characterized by the provision of three equilaterally spaced recesses 41 each seating a coil spring 42. The spacing of the recesses 41 corresponds with the spacing of the embossments 31 on the movable contact member or plate 30 so that the end of each coil spring 42 which projects beyond the end surface of the carrier body 39 will bottom in a corresponding recess on one face of the carrier member or plate 30 provided by each corresponding embossment 31. The axially directed continuous biasing force exerted by the springs 42 between the carrier assembly 33 and the movable contact member plate 30 insures good electrical contact with the contact terminals 29 (Figure 3).

The disk-shaped portion 40 of the carrier body 39 is also peripherally recessed in axial direction as indicated at 43 for receiving a corresponding tongue or lug 38 provided on the frame member 34. By striking over the ends of the lugs or tongues 38, the carrier body 39 may be placed in firm assembly within the frame member 34.

Projecting from one side of the disk-shaped portion 40 is a reduced diameter portion 44 having a central recess 46 sized and shaped to journal the hub 32 in the casing 21. The body portion 36 of the frame member 34 is appropriately recessed in register with the recess 46 so that the entire carrier assembly 33 will be rotatably supported in the chamber 22 of the casing 21 on the hub 32 when the parts are assembled.

Interposed between the reduced diameter portion 44 and the frame member 34 is a helically turned torsion spring 47. One end of the torsion spring 47 is indicated at 48 (Fig. 2) and is secured to the frame member 34. The other end of the torsion spring 47 is indicated at 49 and is arranged to project radially outwardly of the carrier assembly 33 for engagement behind one of the lugs 38 on the frame member 34. By virtue of this arrangement, the torsion spring 47 may be preloaded and the end 49 project sufficiently to engage an abutment 50 projecting inwardly into the chamber 22 of the casing 21.

It will be understood that with the end of the spring indicated at 49, engaged behind the abutment 50, rotation of the carrier assembly will be permitted because the end 49 of the spring 47 will move through a recess 51 provided in the side walls 37 of the frame member 34 between the spaced apart lugs 38. By virtue of such arrangement, the carrier assembly 33 will move against the resilient bias of the torsion spring 47 and when the displacement forces are removed from the carrier assembly 33, the torsion spring 47 will operate to return the carrier assembly 33 to initial position.

The casing 21 is provided with a wall 52 which lies adjacent the carrier assembly 33 and which extends radially of the rotational axis provided by the hub 32.

Formed in the wall 52 are a plurality of circumferentially spaced recesses each indicated generally at 53. The recesses 53 as clearly shown in the development of Figure 6 includes a first recess means 54 having a tapered bottom providing an inclined raceway. Each of the recesses 53 further includes a second recess means 56.

The reduced diameter portion 44 of the carrier body 39 is provided with a corresponding plurality of recesses 57 each seating a coil spring 58 engaged against a shiftable member which may conveniently comprise a ball 59. The axially directed biasing force exerted by the springs 58 against the balls 59 urge the balls 59 toward the deeper portions of the raceways provided by the recess means 54. Thus, when the carrier assembly 33 is moved in one angular direction, the balls 59 will be shifted out of the recess means 54 and into the recess means 56, thereby to lock the carrier assembly in an adjusted angular position, the recess means 56 and the balls 59 acting as a locking detent means.

When carrier assembly 33 is rotated in an opposite direction, the balls 59 will ride up the camming surface provided by the inclined raceways, thereby stressing the springs 58 so that an increased axial load is exerted by the springs 58. As soon as the carrier assembly 33 is released, however, the springs 58 acting through the balls 59 will rotatably drive the carrier assembly 33 back to the initial angular aligned position with the balls moving into the deeper portions of the raceways provided by the recess means 54.

To effect selective actuation of the carrier assembly 33, the frame member 34 is provided with an axially extending actuating lug 60. The lug 60 is received in a slot 61 formed at one end 62 of an operating lever arm 63 pivotally connected as at 64 to the housing 18 and having a cap member 66 affixed on the opposite end of the lever arm 63.

The casing 21 is recessed as at 67 so that the end 62 of the lever arm may pivotally move in the recess 67 while in engagement with the actuating lug 60, thereby to angularly shift the carrier assembly 33.

It may be noted that the cap 66 is preferably made of rubber or a similar resilient material to facilitate operative engagement with the pedal extremeties of an operator in control of vehicle 10.

It may be further noted that the medial position of the operating lever 63 as shown in Figure 2 corresponds to the position of the carrier assembly 33 when the balls 59 are located in the deepest portions of the raceways provided by the recess means 54. Thus, if the operating lever arm 63 is moved in one direction the balls 59 will be angularly shifted together with the carrier assembly 33 so that the balls 59 will be seated in the recess means 56, thereby temporarily locking the carrier assembly 33 in angularly adjusted position.

The parts will remain in locked position until the operating lever arm 63 is again operated in an opposite direction whereupon the balls will be returned to the recess means 54.

If the operating lever arm 63 is actuated in opposite direction, the balls 59 will be driven over the camming surfaces provided by the inclined raceways forming the bottoms of the recess means 54 and the parts will tend to be automatically restored to initial position upon release of the operating lever arm 63. Moreover, when the operating lever arm 63 is moved in this direction, the carrier assembly 33 is also moved against the bias of the torsion spring 47 by virtue of the engagement of the end of the spring 49 with the abutment 50 on the housing 18.

The increased tension on the torsion spring 47 also assists in returning the carriage assembly 33 to its initial position.

It will be appreciated that the movable contact member 30 is also angularly positioned upon actuating of the operating lever arm 63 and the carrier assembly 33 so that the respective contact terminals 28 are selectively bridged, thereby to either permanently or temporarily override the light sensitive switching means 16 in the headlight control circuit.

Although various minor structural modifications might be suggested by those skilled in the art, it should be understood that we wish to embody within the scope of the patent warranted hereon all such modifications as reasonably and properly fall within the scope of our contribution of the art.

We claim as our invention:

1. In control circuit means for an automobile headlight circuit of the type comprising a source of illumination including a headlight for selectively projecting a high beam or low beam, and a light sensitive switching means in control of said source for automatic regulation of said source in response to variations in light intensity from the headlights of approaching vehicles, the improvement of a pedal operated switch in circuit with said source and with said light sensitive switching means, said improvement comprising a switch housing adapted to be mounted on a floor board of the vehicle, a pedal actuated operating lever projecting out of said housing adapted to be adjusted to selected positions by an operator, said lever having a medial pivot connection with said housing, adjacent rotatable parts in said housing having cooperating switch contact members, said parts and said end of said lever inside of said housing having lug and slot engaging portions effecting a driven connection of said parts with said operating lever, continuous biasing means between said parts arranged to load said parts axially, shiftable members between said biasing means and one of said parts, and said shiftable members engaging said one of said parts at inclined camming surfaces provided thereon whereupon said operating lever may be angularly moved in one direction to drive said parts and said switch contact members to a first position to temporarily override said light sensitive switching means, said continuous biasing means being placed under increased axial load upon movement of said parts to said first position, whereupon said parts will be restored to initial position upon release of said operating lever, said shiftable members engaging said one of said parts at a recess means adjacent said camming surfaces when said operating lever is angularly moved in an opposite direction, thereby to lock said parts and said switch contact members in a second position to selectively permanently override said light sensitive switch means.

2. A pedal operated switch comprising a switch housing providing a flange adapted to be attached to a supporting surface and a casing adapted to be concealed below the level of said supporting surface, a carrier in said housing rotatable on a predetermined axis, said casing having a wall adjacent said carrier and extending radially of said axis, a plurality of circumferentially spaced recesses in said wall, an axially biased shiftable means between said carrier and said wall, said recesses including a first recess means receiving such shiftable means and retaining said carrier in a first angularly aligned position, said recesses including a second recess means having a tapered bottom providing an inclined raceway and directing said axially biased shiftable means in angular direction to rotatably drive said carrier to a second angularly aligned position, said carrier having an axially extending lug formed thereon, an operating lever arm pivoted in said housing and having a slot formed at one end thereof inside of said casing engaging said lug, said operating lever arm having a pedal engageable actuating portion at the opposite end thereof extending above the level of said supporting surface, and switch contact means supported by said carrier, said lever arm selectively angularly shifting said carrier, and shiftable means between said first and second parts to selectively angularly shift said carrier and said shiftable means up said inclined raceway to a third angularly inclined position, said carrier being automatically released to said second position upon release of said operating arm.

3. A control switch, comprising, a switch housing providing a boss portion adapted to be attached to a supporting surface and a casing adapted to be concealed below the level of said supporting surface, a carrier in said housing rotatable on a pre-determined axis, said casing having a wall adjacent said carrier and extending radially of said axis, a plurality of circumferentially spaced recesses in said wall, axially biased shiftable means between said carrier and said wall, said recesses including a first recess means receiving said shiftable means and retaining said carrier in a first angularly aligned position, said recesses including a second recess means having a tapered bottom providing an inclined raceway and directing said axially biased shiftable means in angular direction to rotatably drive said carrier to a second angularly aligned position, said carrier having an actuating lug formed thereon, an operating lever arm pivoted in said housing and being operatively connected to said lug at a portion thereof inside of said housing to selectively angularly shift said carrier, said operating lever arm having an actuating portion extending above the level of said supporting surface, and switch contact means between said carrier and said housing, said lever arm selectively angularly shifting said carrier and said shiftable means between said first and second positions to selectively angularly shift said carrier and said shiftable means up said inclined raceway to a third angularly aligned position, said carrier being automatically released to said second position upon release of said operating lever arm, said carrier further including a pre-loaded torsion spring having one end extending radially outwardly into engagement with an abutment formed on said housing, thereby to resiliently resist movement of said carrier to said third position and assisting in returning said carrier to said second position upon release of said operating lever arm.

4. In circuit means of the type including an automotive headlight having means to project a high beam and a low beam and light-sensitive switching means in control of said headlight to automatically regulate the projection of said high and said low beams in response to the approach of oncoming automobile headlights, the improvement of an operator-regulated switch to selectively override said light-sensitive switching means, said operator-regulated switch comprising a pedal-operated switch having a switch housing providing a flange adapted to be attached to a supporting surface and a casing adapted to be concealed below the level of said supporting surface adjacent the pedal extremities of the operator, a carrier in said housing rotatable on a predetermined axis, said casing having a wall adjacent said carrier and extending radially of said axis, a plurality of circumferentially spaced recesses in said wall, an axially biased shiftable means between said carrier and said wall, said recesses including a first recess means receiving said shiftable means and retaining said carrier in a first angularly aligned position, said recesses including a second recess means having a tapered bottom providing an inclined raceway and directing said axially biased shiftable means in angular direction to rotatably drive said carrier to a second angularly aligned position, said carrier having an axially extending lug formed thereon, an operating lever pivoted in said housing and having a slot formed at one end thereof inside of said casing engaging said lug, said operating lever arm having a pedal engageable actuating portion at the opposite end thereof extending above the level of said supporting surface adjacent the pedal extremities of the automotive operator, and switch contact means supported by said carrier, said lever arm when moved selectively angularly shifting said carrier, and shiftable means between said first and second parts to selectively angularly shift said carrier and said shiftable means of said inclined raceway to a third angularly inclined position, said carrier being automatically released to said position upon release of said operating arm, thereby to selectively temporarily or permanently override said light-sensitive switching means upon selective movement of said lever arm.

References Cited in the file of this patent

UNITED STATES PATENTS

| | | |
|---|---|---|
| 1,857,875 | Salinas | May 10, 1932 |
| 2,027,538 | Krieger | Jan. 14, 1936 |
| 2,511,069 | Lawson et al. | June 13, 1950 |
| 2,654,005 | Weber | Sept. 29, 1953 |
| 2,686,277 | Bordewieck et al. | Aug. 10, 1954 |